(12) United States Patent
Yoshida et al.

(10) Patent No.: US 8,201,586 B2
(45) Date of Patent: Jun. 19, 2012

(54) SEALING PUMP-UP DEVICE

(75) Inventors: Masaki Yoshida, Kodaira (JP); Ryuji Izumoto, Kodaira (JP); Shinichi Iwasaki, Kodaira (JP); Rieko Iwasaki, legal representative, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 586 days.

(21) Appl. No.: 12/305,580

(22) PCT Filed: Jun. 13, 2007

(86) PCT No.: PCT/JP2007/061913
§ 371 (c)(1),
(2), (4) Date: Jul. 15, 2009

(87) PCT Pub. No.: WO2007/148580
PCT Pub. Date: Dec. 27, 2007

(65) Prior Publication Data
US 2010/0224281 A1   Sep. 9, 2010

(30) Foreign Application Priority Data

Jun. 20, 2006 (JP) ................................ 2006-170516
Nov. 29, 2006 (JP) ................................ 2006-322207

(51) Int. Cl.
*B65B 31/00* (2006.01)
(52) U.S. Cl. .......... 141/38; 141/105; 141/114; 141/231; 141/313; 141/330; 81/15.6
(58) Field of Classification Search .......... 141/38, 141/67, 100, 105, 114, 231, 313, 329, 330, 141/351; 81/15.6
See application file for complete search history.

(56) References Cited

U.S. PATENT DOCUMENTS
6,766,834 B1   7/2004  Eckhardt
(Continued)

FOREIGN PATENT DOCUMENTS
JP   2000-108215 A   4/2000
(Continued)

OTHER PUBLICATIONS

European Search Report issued Nov. 29, 2011 for counterpart European Application No. 07745180.5.

*Primary Examiner* — Gregory Huson
*Assistant Examiner* — Jason Niesz
(74) *Attorney, Agent, or Firm* — Sughrue Mion, PLLC

(57) ABSTRACT

To prevent a burr, produced from the joint portion by welding between a liquid agent container and an injection unit, from interfering with a boring member inserted into a jig communication passage when the boring member is inserted into the jig communication passage to prevent the obstruction of the piercing action through a sealing member by the edge of the boring member. In the sealing pump-up device 10, a tubular inner annular member 104 is integrally formed on the inner peripheral side of a joined portion 37 in an injection unit 20 so as to surround, from an outer peripheral side, a boring member 62 held in a jig insertion hole 44, and a burr housing unit 106 consisting of an almost cylindrical space is formed between the outer annular member 28 of a liquid container 18 and the tubular inner annular member 104, whereby it is possible to guide the tip end side of a burr 110, extending from the joint portion between the outer annular member 28 and a joined portion 37 toward the inner peripheral side, from moving toward the boring member 62 side of the burr 110 by means of the tubular inner annular member 104.

3 Claims, 7 Drawing Sheets

U.S. PATENT DOCUMENTS

| | | | |
|---|---|---|---|
| 6,968,869 B2 * | 11/2005 | Eckhardt | 141/38 |
| 7,694,698 B2 * | 4/2010 | Marini | 141/38 |
| 2004/0216806 A1 * | 11/2004 | Eckhardt | 141/38 |
| 2005/0191193 A1 * | 9/2005 | Chou | 417/437 |
| 2008/0029181 A1 * | 2/2008 | Marini | 141/38 |
| 2008/0092984 A1 * | 4/2008 | Marini | 141/38 |
| 2008/0230142 A1 * | 9/2008 | Hickman | 141/38 |

FOREIGN PATENT DOCUMENTS

| | | |
|---|---|---|
| JP | 2005-199618 A | 7/2005 |
| JP | 2007-168418 A | 7/2007 |
| WO | WO 2007/030896 A1 | 3/2007 |

* cited by examiner

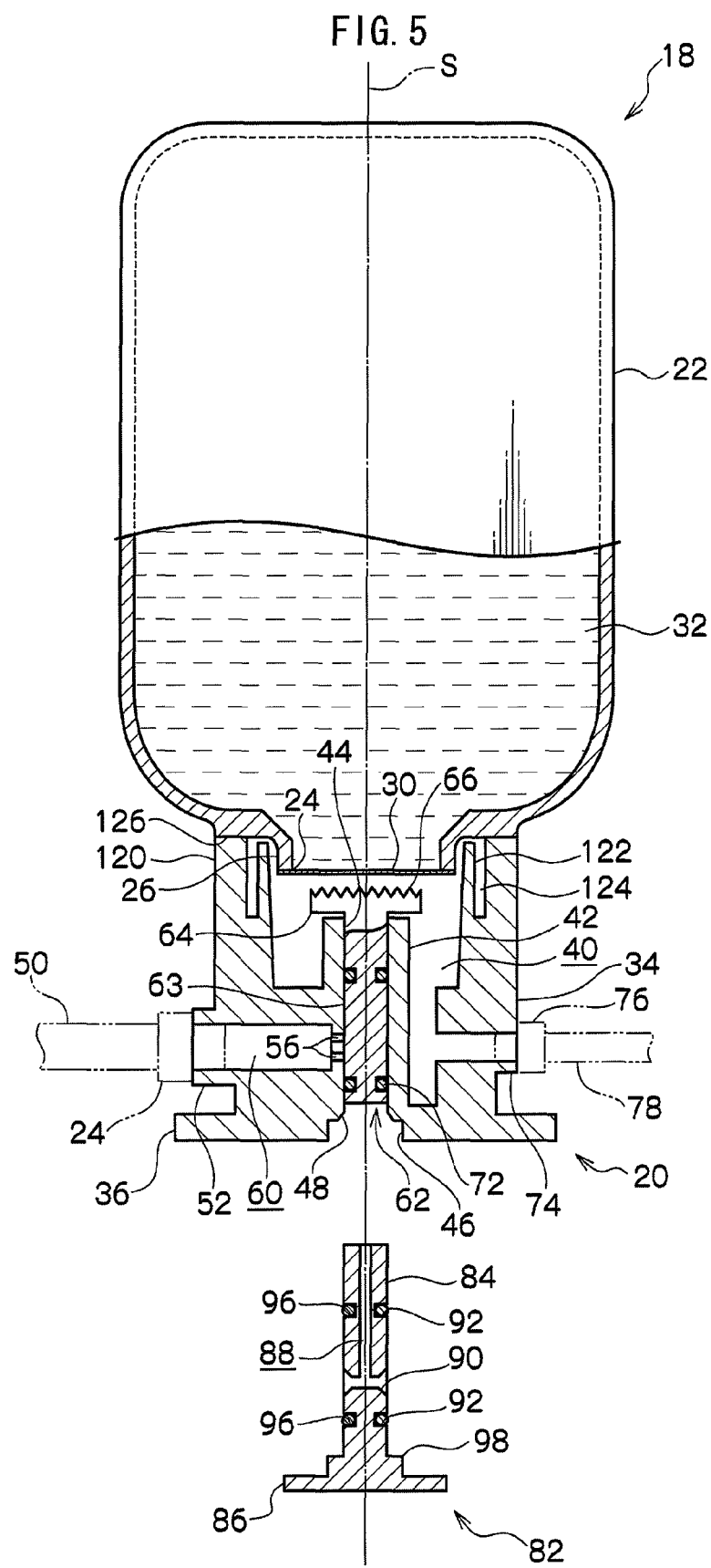

SEALING PUMP-UP DEVICE

TECHNICAL FIELD

The present invention relates to a sealing pump-up device for sealing a punctured pneumatic tire by injecting a sealing agent into the pneumatic tire, and also for supplying compressed air into a pneumatic tire, raising the pressure of the pneumatic tire.

RELATED ART

Sealing pump-up devices have recently become popular in which, when a pneumatic tire (referred to below simply as tire) punctures, instead of changing the tire or the wheel, the tire is repaired with a sealing agent and then pumped up to the specified internal pressure. Known examples of such types of sealing pump-up device are, for example, described in Japanese Patent Application Laid-Open (JP-A) No. 2005-199618.

The sealing pump-up device shown in JP-A No. 2005-199618 is provided with a liquid container in which a sealing agent is stored and which has an outlet for exchangeably mounting a housing unit closed off with a piercable cap (sealing member) made from aluminum foil, and a unit body (injection unit) provided with a housing having a tubular body portion and with a piston shaped switching component disposed movably within the body portion. A flow inlet port (air supply port) communicating with a compressed air source and an ejection port communicating with a tire are provided to the body portion of the housing. In addition the switching component is capable of moving within the body portion from a position (retreated position) separated from the sealing member to a position (piercing position) for piercing the sealing member with a leading end piercing portion (blade portion).

In the sealing pump-up device described in JP-A No. 2005-199618 when the switching component is in the retreated position, the flow inlet port is in communication with an ejection port through a main communication path formed in the switching component, and compressed air supplied from the compressed air source to within the body portion is supplied into the tire. When the switching component is moved to the piercing position the compressed air supplied from the compressed air source to within the body portion through the main communication path of the switching component is supplied into the liquid container. The static pressure of the air accumulation formed within the liquid container pushes the sealing agent out from the outlet, and the sealing agent is supplied into the tire through a gap within the body portion formed between the inner peripheral surface of the body portion and the outer peripheral surface of the switching component, and through the ejection port.

In the sealing pump-up device described in JP-A No. 2005-199618 there is a screw thread formed to the outer peripheral surface of a neck portion of the liquid container, and there is also a screw thread formed to the inner peripheral surface of a connection portion provided in a circular cylindrical shape to the injection unit. The liquid container is connected and fixed to the injection unit by screwing the neck portion of the liquid container into the inner peripheral surface of the connection portion of the injection unit.

However, in the above described sealing pump-up device the strength of the connection portion needs to be made sufficiently strong and also the connection portion needs to have high sealing characteristics since a large hydraulic pressure acts from within when the sealing agent is injected. In order therefore to meet these requirements the following are contemplated to connect and fix the neck portion of the liquid container to the connection portion of the injection unit: making the base end side of the neck portion of a greater diameter than the leading end side thereof; forming an annular step portion at the outer peripheral surface between the leading end side and the base end side; projecting the leading end face of the connection portion of the injection unit out to contact the step portion; and weld connecting, by spin welding or the like.

DISCLOSURE OF THE INVENTION

Problem to be Solved by the Invention

However, when the neck portion of the liquid container is connected to the connection portion of the injection unit by welding in the above described manner it is difficult to control the direction of extension of the welding burr generated from the joint portion of the neck portion of the liquid container with the connection portion of the injection unit. If the welding burr extends from the joint portion to the inner peripheral side then sometimes the tip end side of the welding burr covers the sealing member from below. If the welding is reduced then the volume of welding burr generated can be reduced, but the strength of the connection portion is not maintained and control in mass production is difficult. If the generated volume of welding burr is large and the tip end side of the welding burr covers the sealing member then when the boring member is pressed toward the piercing position side, the blade portions of the boring member hit the resin welding burr. This consequently obstructs movement of the boring member to the piercing position, or even if the blade portions reach the piercing position they then may no longer be able to pierce the sealing member normally.

In the light of the above circumstances an object of the present invention is to provide a sealing pump-up device that, in order to prevent the obstruction of the piercing action by the blade portions of the boring member through a sealing member, prevents a burr, produced from the joint portion by welding between a liquid container and an injection unit, from interfering with a boring member inserted into a jig communication passage when the boring member is inserted into the jig communication passage.

Method of Solving the Problem

A sealing pump-up device according to claim 1 of the present invention is provided with: a liquid container for storing a sealing agent, the liquid container also formed with an ejection port for ejecting the sealing agent; an injection unit with an air supply path configuring a pressurized liquid supply chamber in communication with the ejection port, and also connected to an air supply source for supplying compressed air, and with an air-liquid supply tube connectable to a valve of a pneumatic tire; an outer annular member provided to one or other of the liquid container or the injection unit and of a greater diameter than that of the ejection port; an inner annular member, provided to the other of the liquid container and the injection unit, of smaller diameter that that of the outer annular member and disposed to the radial direction inside of the outer annular member; and a burr housing unit configured between the outer annular member and the inner annular member, the liquid container being fixed to the injection unit via the outer annular member.

In the sealing pump-up device according to claim 1 of the present invention the outer annular member is provided to one or other of the liquid container or the injection unit and the inner annular member is provided to the other of the liquid container and the injection unit. The burr housing unit is configured between the outer annular member and the inner annular member (of smaller diameter than the outer annular member) and the liquid container is fixed to the injection unit via the outer annular member. When the press jig is inserted into the jig insertion hole, the burr generated from the joint portion by welding the liquid container, can be prevented from interfering with the boring member being pushed out from within the jig communication passage and the injection unit can be prevented from obstructing the piercing operation of the sealing member with the blade portions of the boring member.

When the radius of the weld portion increases, the weld strength required for the weld portion increases in proportion to the square of the radius, therefore a small diameter is desirable for the weld portion. However, if the weld portion is made small then the burr generated on welding cannot be ignored, and the above described burr housing unit is required.

The sealing pump-up device according to claim 2 of the present invention is the sealing pump-up device of claim 1, wherein: the outer annular member extends from the liquid container and is welded to the injection unit; the inner annular member extends from the injection unit; and the burr housing unit configured between the outer annular member and the inner annular member is positioned between the welding face of the outer annular member and the injection unit, and the liquid ejection port of the liquid container.

The sealing pump-up device according to claim 3 of the present invention is the sealing pump-up device of claim 1, wherein: the outer annular member extends from the injection unit and the outer annular member and the liquid container are welded together; the inner annular member extends from the injection unit so as to substantially contact the liquid container; and the burr housing unit is formed by the inner annular member.

The sealing pump-up device according to claim 4 is the sealing pump-up device of claim 1, wherein: the inner annular member extends from a main body portion of the liquid container and is inserted inside the outer annular member; the outer annular member extends from the injection unit and an end portion of the outer annular member is welded to the main body portion of the liquid container; and the burr housing unit is a groove formed in the outer peripheral surface of the inner annular member.

Effect of the Invention

As described above, according to the sealing pump-up device of the present invention, when the boring member is inserted into the jig insertion hole, the burr generated from the joint portion by welding the liquid container and the injection unit, is prevented from interfering with the boring member being inserted into the jig communication passage, enabling the prevention of obstructing the piercing operation of the sealing member with the blade portions of the boring member.

BRIEF DESCRIPTION OF THE DRAWINGS

FIG. 5 is a cross-section of a modified example of a liquid container and an injection unit applicable to the sealing pump-up device shown in FIG. 1.

BEST MODE OF IMPLEMENTING THE INVENTION

First Exemplary Embodiment

Explanation will now be given of a sealing pump-up device according to a first exemplary embodiment of the present invention.

Configuration of the Sealing Pump-Up Device

Figure 1:
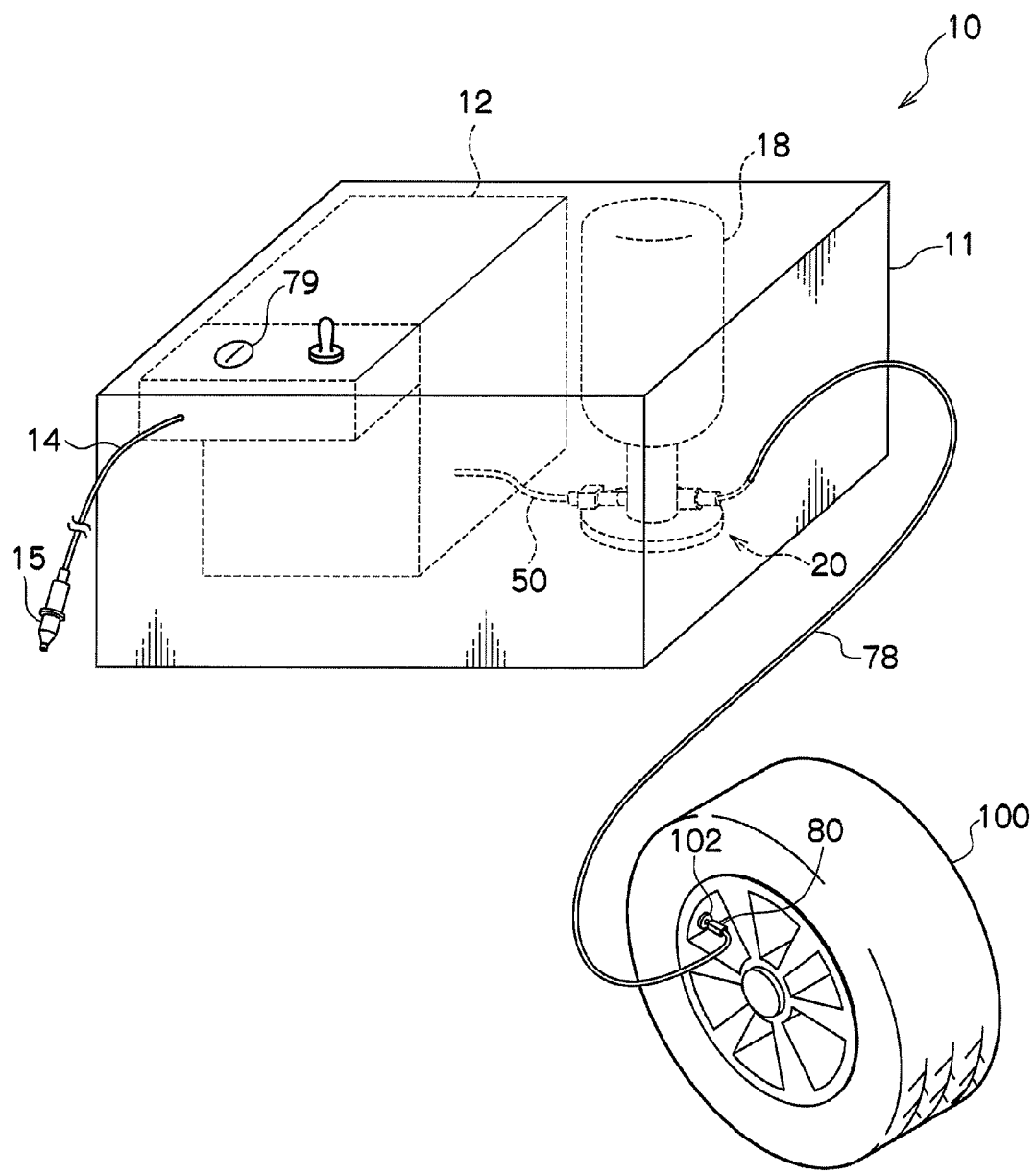
FIG. 1 is a perspective view showing the configuration of a sealing pump-up device according to a first exemplary embodiment of the present invention.

A sealing pump-up device according to an exemplary embodiment of the present invention is shown in FIG. 1. A sealing pump-up device 10 is used when there is a puncture to a pneumatic tire (referred to below simply as tire) mounted to a vehicle such as an automobile, for repairing the tire with a sealing agent and re-pressurizing the tire up to the specified pressure (pump-up), without changing the tire or the wheel.

The sealing pump-up device 10, as shown in FIG. 1, is provided with a casing 11 as an external shell, and a compressor unit 12, an injection unit 20, and a liquid container 18, connected and fixed to the injection unit 20, are disposed within the casing 11.

A motor, air compressor, power circuit, control board and the like are disposed within the compressor unit 12, and a power supply cable 14 is also provided extending from the power circuit to outside the unit. Power supply by the battery mounted to a vehicle is possible to the motor etc. through the power circuit by inserting a plug 15 provided to the leading end portion of the power supply cable 14 into, for example, a socket of a cigarette lighter provided in the vehicle. The compressor unit 12 is capable of generating with the air compressor a higher pressure (for example 300 kPa or above) of compressed air than the pressure specified for each type of tire 100 requiring repair.

Figure 2:
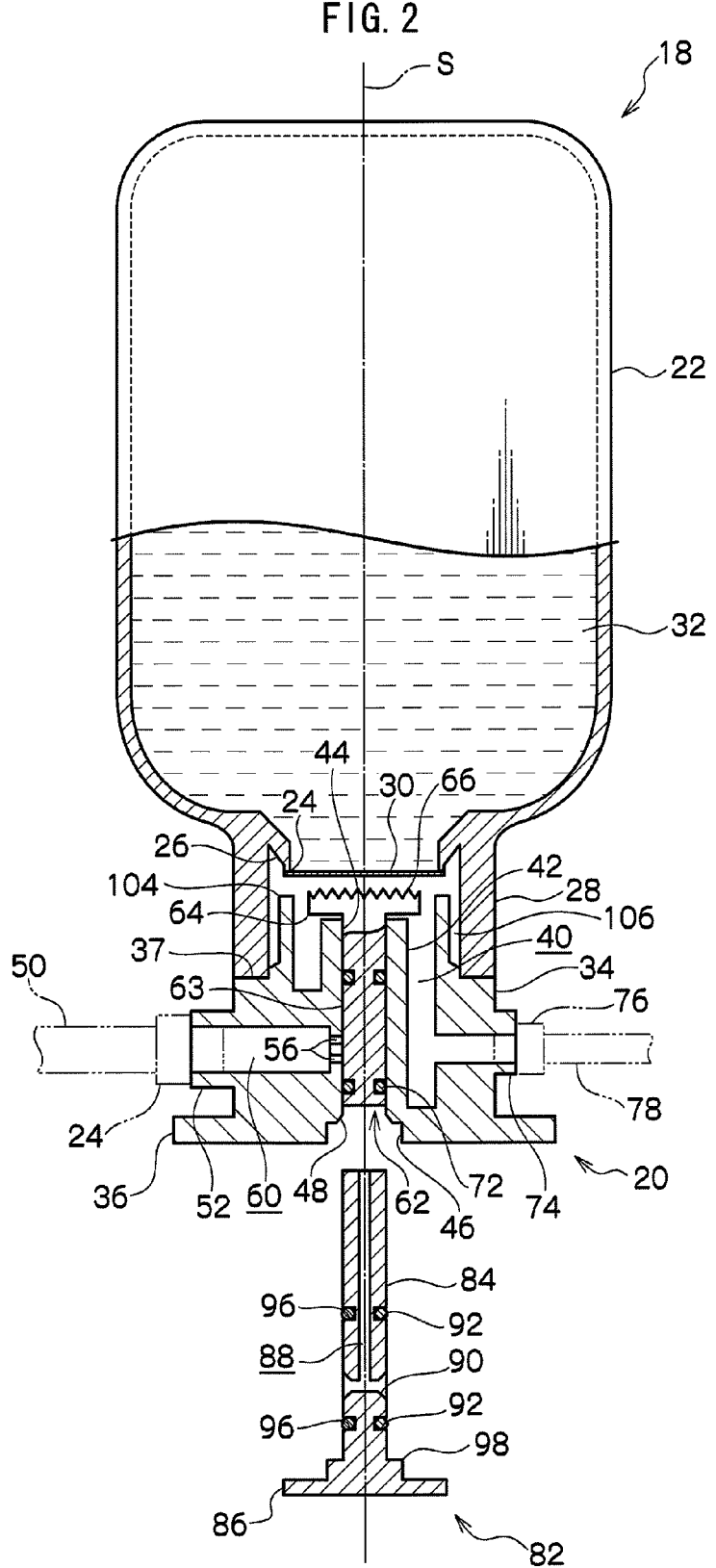
FIG. 2 is a cross-section of the sealing pump-up device shown in FIG. 1, showing the configuration of a liquid container, an injection unit and a press jig.

The sealing pump-up device 10, as shown in FIG. 2, is provided with a liquid container 18 in which is accommodated a sealing agent 32, and the injection unit 20 connected to the liquid container 18. A neck portion 26 is integrally formed in a substantially cylindrical shape at a bottom end portion of the liquid container 18, projecting out downward. The neck portion 26 is formed with a diameter narrower than that of a container body portion 22 at the top side above the neck portion 26. An ejection port 24 for the sealing agent 32 is formed as a circular opening at the bottom end of the neck portion 26, and the ejection port 24 is sealed closed by a membrane shaped aluminum seal 30. The outer peripheral edge portion of the aluminum seal 30 is fixed across the whole of the peripheral edge portion of the ejection port 24 of the neck portion 26, by use of an adhesive or the like.

An outer annular member 28 is integrally formed at the outer peripheral side of the neck portion 26 as a thick walled circular cylinder. The outer annular member 28 and the container body portion 22 are disposed coaxially to axial center S of the liquid container 18. The bottom face of the outer annular member 28 is an annular joining face 29, and the joining face 29 is positioned below the ejection port 24.

The liquid container 18 is formed from a resin material such as PP, PE or the like, and the injection unit 20 is also integrally formed of the same resin material as the liquid container 18, such as PP, PE, or the like, being spin weldable to the outer annular member 28 of the liquid container 18. Slightly more sealing agent 32 is filled within the liquid container 18 than the standard amount (for example 200 g to 400 g) corresponding to the each type and size etc. of the tire 100 requiring repair by the sealing pump-up device 10. It should be noted that the liquid container 18 of the present exemplary embodiment is filled with no voids within the sealing agent 32 and without the provision of an air space, however in order to prevent deterioration by oxidation, nitration etc. of the sealing agent 32 a small amount of an inert gas such as Ar or the like may be sealed together with the sealing agent 32 within the liquid container 18 when filling.

When the sealing pump-up device 10 is in a state in which the liquid container 18 is positioned directly above the injection unit 20, the aluminum seal 30 of the liquid container 18 is in a pressure applied state due to the weight of the sealing agent 32 within the liquid container 18.

Figure 4A:
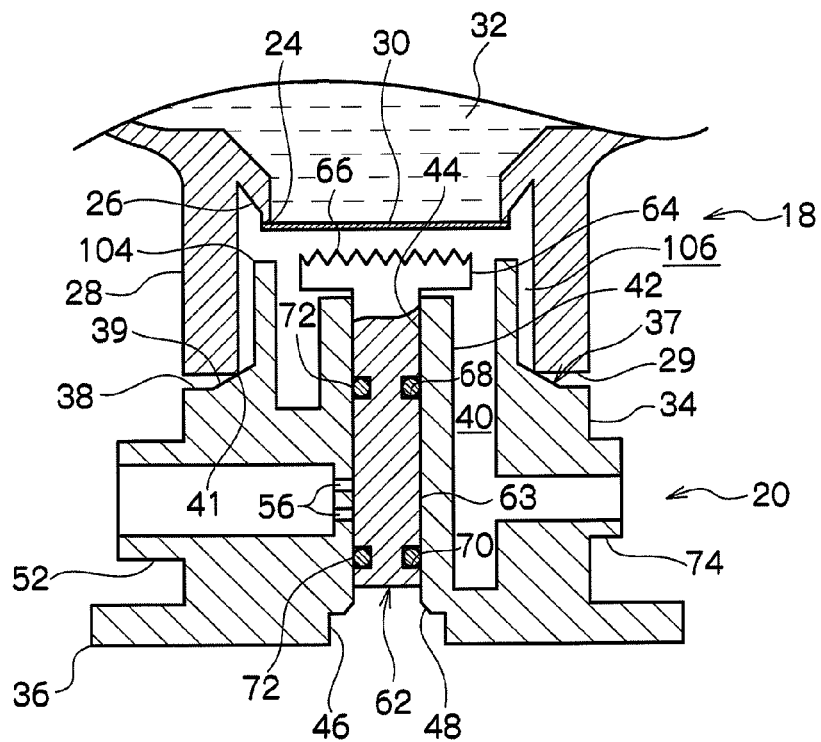
FIG. 4A is an expanded view of a liquid container, injection unit and press jig prior to welding.

A unit main body portion 34 and a foot portion 36 are integrally provided in the injection unit 20, as shown in FIG. 2. The unit main body portion 34 is formed into a substantially circular bottomed cylinder shape open toward the top, and the foot portion 36 is of a circular flange shape extending to the outer peripheral side from the bottom portion of the unit main body portion 34. As shown in FIG. 4A, a circular annular joined portion 37 is formed to the outer peripheral side at the top end face of the unit main body portion 34. The external diameter of the joined portion 37 substantially matches the external diameter of the joining face 29 of the liquid container 18, and the width in the radial direction of the joined portion 37 is just slightly wider than that of the joining face 29. An annular reference face 38 is formed as a flat surface extending in the circumferential direction at the outer peripheral side of the joined portion 37. An annular guide face 39 is also formed to the joined portion 37 at the inner peripheral side of the reference face 38, the guide face 39 being a taper shaped curved face inclined upward on progression from the outer periphery thereof toward the inner peripheral side.

In the sealing pump-up device 10 the liquid container 18 is connected and fixed to the injection unit 20 by spin welding the outer annular member 28 of the liquid container 18 to the joined portion 37 of the unit main body portion 34. When, as shown in FIG. 1, the outer annular member 28 is connected to the joined portion 37 a substantially circular cylindrical shaped liquid supply pressure chamber 40 is formed between the liquid container 18 and the injection unit 20, the liquid supply chamber 40 being sealed closed on the outer peripheral side by the outer annular member 28. The liquid supply pressure chamber 40 is in communication with the inside of the liquid container 18 when the aluminum seal 30 is pierced by a boring member 62.

A circular cylindrical shaped tubular inner annular member 104 is integrally formed around the inner peripheral edge of the joined portion 37 at the top face of the unit main body portion 34. The external diameter of the tubular inner annular member 104 is smaller than the internal diameter of the outer annular member 28. By configuration in this manner there is a circular cylindrical shaped burr housing unit 106 between the outer annular member 28 of the liquid container 18 and the tubular inner annular member 104 of the unit main body portion 34, the burr housing unit 106 sealed closed at the bottom at the inner peripheral side of the joined portion 37 and open at the top.

Figure 4B:
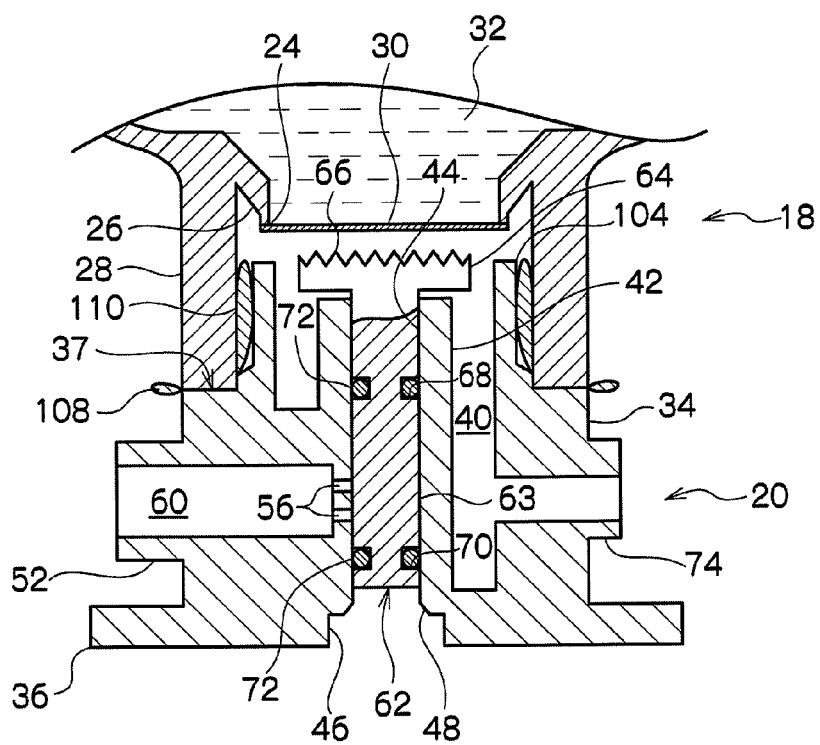
FIG. 4B is an expanded view of the liquid container, injection unit and press jig after welding.

In the sealing pump-up device 10, as shown in FIG. 4B, the height of the tubular inner annular member 104 with reference to the weld-joined portion between the joining face 29 of the liquid container 18 and the joined portion 37 of the injection unit 20 is H, and the internal volume of the burr housing unit 106 is V.

As shown in FIG. 4, there is a circular cylindrical shaped inner peripheral tubular portion 42 formed coaxially to the injection unit 20. A circular cross-section jig insertion hole 44 is formed at a central portion of the inner peripheral tubular portion 42, passing through from the bottom end face of the injection unit 20 to the top end face of the inner peripheral tubular portion 42. An insertion fitting recess portion 46 is formed as a circular shaped recess to a central portion of the bottom end face of the injection unit 20, with the internal diameter of the insertion fitting recess portion 46 being larger than the internal diameter of the jig insertion hole 44. The bottom face central portion of the insertion fitting recess portion 46 is thereby opened at the bottom end of the jig insertion hole 44.

An insertion guide face 48 is formed in a tapered shape to the inner peripheral surface of the jig insertion hole 44, with the internal diameter at the open end portion on the entry side (bottom end portion) reducing in diameter on progression from the open end further into the opening. The insertion guide face 48 is provided for guiding the leading end portion of a later described press jig 82 toward the far side of the jig insertion hole 44 when the press jig 82 is being inserted into the jig insertion hole 44.

There is a pressure hose 50 provided in the sealing pump-up device 10 extending from the compressor unit 12, as shown in FIG. 1, and the base end portion of the pressure hose 50 is connected to the air compressor within the compressor unit 12.

In the injection unit 20, as shown in FIG. 2, there is circular cylindrical shaped air supply tube 52 formed extending from the outer peripheral side of the inner peripheral tubular portion 42 and passing through the unit main body portion 34 toward the outer peripheral side. The leading end portion at the outer peripheral side of the air supply tube 52 is connected to the leading end of the pressure hose 50 through a nipple 54. Plural restricted portions 56 (two in the present exemplary embodiment) are provided at the base end portion of the air supply tube 52, piercing through the peripheral wall portion of the inner peripheral tubular portion 42 and communicating with the inside of the jig insertion hole 44.

The restricted portions 56 of the inner peripheral tubular portion 42 are formed as through holes each of circular cross-sectional shape, with a uniform internal diameter along the whole of their length, the internal diameter thereof being smaller than the internal diameter of the air supply tube 52.

The internal space within the pressure hose 50, the air supply tube 52 and the restricted portions 56 configures an air supply path 60 for supplying compressed air from the air compressor to the liquid container 18 or to the tire 100.

An axial portion 63 of the boring member 62 is inserted into the jig insertion hole 44 at the liquid supply pressure chamber 40 side. A circular flange shaped hole piercing portion 64 is provided spreading out radially to the outer peripheral side at the top end portion of the axial portion 63. Blade portions 66 are formed at the outer peripheral edge of the top face of the hole piercing portion 64, the blade portions 66 being formed in a series of protrusion shapes for readily rupturing the aluminum seal 30. An annular shaped fitting insertion groove 68 and annular shaped fitting insertion groove 70 are formed to the outer peripheral surface of the axial portion 63, at positions above and below air supply ports 58 when the axial portion 63 is in a state of having been inserted into the jig insertion hole 44. Rubber O-rings 72 are fitted into the fitting insertion grooves 68, 70.

When the axial portion 63 is in an inserted state into the jig insertion hole 44, the outer peripheral edge portions of each of the pair of O-rings 72 are in press contact along the entire circumference from the inner peripheral surface of the jig insertion hole 44. The jig insertion hole 44 is thereby in a closely sealed state, with above and below the air supply ports 58 closed off respectively by the axial portion 63 and the pair of O-rings 72. In this sate the axial portion 63 is retained within the jig insertion hole 44 by friction between the O-rings 72 and the inner peripheral surface of the jig insertion hole 44. In this state the leading end face of the hole piercing portion 64 directly faces the center of the aluminum seal 30, with there being a small gap between the hole piercing portion 64 and the aluminum seal 30.

A circular cylindrical shaped air-liquid supply tube 74 is integrally formed in the injection unit 20 so as to penetrate through the bottom end of the peripheral wall of the unit main body portion 34, as shown in FIG. 2. The base end portion of a joint hose 78 is connected through a nipple 76 to the leading end portion at the outer peripheral side of the air-liquid supply tube 74. A valve adapter 80, detachably connecting to a tire valve 102 of the tire 100, is provided at the leading end portion of the joint hose 78. The base end side of the air-liquid supply tube 74 is inserted into the liquid supply pressure chamber 40. The joint hose 78 is thereby in communication with the inside of the liquid supply pressure chamber 40 through the air-liquid supply tube 74.

Explanation will now be given of the press jig 82 when used to eject sealing agent 32 from the sealing pump-up device 10.

The press jig 82, as shown in FIG. 2, is provided with a bar shaped insertion portion 84 and a circular flange shaped base portion 86 formed to one end of the insertion portion 84. A jig communication path 88 is formed in the insertion portion 84, the jig communication path 88 extending from the leading end face toward the base portion 86 side, branching at an intermediate portion into plural branches (for example 2), with each branch extending out toward the outer peripheral side. An annular shaped communication groove 90 is formed in the outer peripheral surface of the insertion portion 84, forming an airway to the opening portions of the jig communication path 88.

A fitting insertion groove 92 and a fitting insertion groove 94 are formed respectively above and below the communication groove 90 in the outer peripheral surface of the insertion portion 84. O-rings 96 are respectively fitted into the pair of fitting insertion grooves 92, 94. The O-rings 96 used are of the same dimension and material as of the O-rings 72 disposed in the boring member 62.

Figure 3:
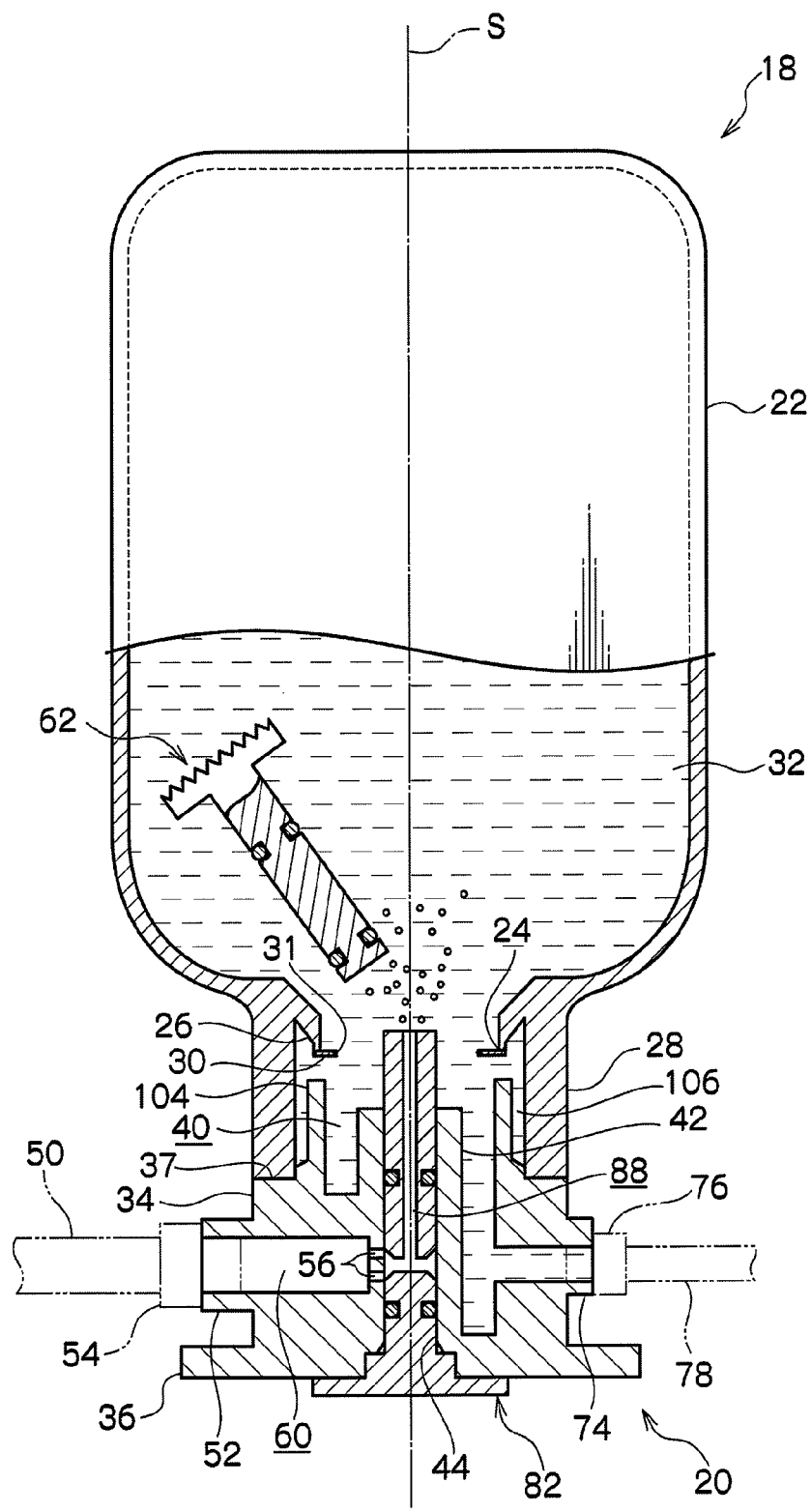
FIG. 3 is a cross-section showing a liquid container into which the press jig has been inserted, and the injection unit.

A fitting insertion projection portion 98 is integrally formed to the press jig 82, between the base end portion of the insertion portion 84 and the base portion 86 and with a diameter larger than that of the insertion portion 84. The fitting insertion projection portion 98 has an external diameter and height corresponding to the internal diameter and depth of the insertion fitting recess portion 46 formed in the bottom end face of the injection unit 20. Thereby, as shown in FIG. 3, the fitting insertion projection portion 98 fits inserted within the insertion fitting recess portion 46 when the whole of the insertion portion 84 is inserted within the jig insertion hole 44. The press jig 82 is retained by friction with the insertion portion 84 in an inserted state within the jig insertion hole 44 by the fitting insertion projection portion 98 being in a press-fit state insertion fitted within the insertion fitting recess portion 46.

The length of the insertion portion 84 is slightly longer than the path length of the jig insertion hole 44. Thereby, when the entire insertion portion 84 of the press jig 82 is inserted within the jig insertion hole 44, as shown in FIG. 3, the boring member 62 is securely pushed out from inside of the jig insertion hole 44, and pushed out into the liquid container 18. In the state in which the entire insertion portion 84 is inserted into the jig insertion hole 44, the communication groove 90 of the insertion portion 84 and the air supply ports 58 are aligned with each other along the axial direction. The air supply path 60 is thereby in communication with the jig communication path 88 of the press jig 82 through the communication groove 90.

The outer peripheral edge portions of each of the pair of O-rings 96 are pressed along the entire circumferential direction against the inner peripheral surface of the jig insertion hole 44 when the insertion portion 84 is in the inserted state within the jig insertion hole 44. The jig insertion hole 44 is thereby in a closely sealed state with respectively above and below the air supply ports 58 closed off by the insertion portion 84 and the pair of O-rings 96.

Explanation will now be given regarding the method of weld-joining the outer annular member 28 of the liquid container 18 to the joined portion 37 of the injection unit 20.

When the outer annular member 28 of the liquid container 18 is connected and fixed to the unit main body portion 34 of the injection unit 20, the liquid container 18 is coaxially mounted in a holder mechanism on the rotation side of a known spin welding machine, and also the injection unit 20 is coaxially fixed to the fixed side of the holder mechanism. In this state, as shown in FIG. 4A, the joining face 29 of the outer annular member 28 abuts the joined portion 37 of the injection unit 20. The joining face 29 only abuts an intermediate portion in the radial direction of the guide face 39 of the joined portion 37, around the entire circumference at an edge portion 41 on the inner peripheral side of the joining face 29, with the joining face 29 to the outer peripheral side of the edge portion 41 positioned away from and above the joined portion 37.

The liquid container 18 is then moved downward at a specific descending speed while being rotated at a specific speed by the rotational side of the holder mechanism. Frictional heat at the contact interface of the joining face 29 and the joined portion 37 gradually causes melting, and the interface between the two components disappears with movement of resin molecules mutually across the interface, weld joining the joining face 29 and the joined portion 37 together. At the initial state of starting welding only the vicinity of the edge portion 41 of the joining face 29 is welded to the guide face 39 of the joined portion 37, and as the welding progresses from the radial direction intermediate portion of the reference face 38 toward the outer peripheral side, the outer annular member 28 automatically adjusts with high precision to a position coaxial to the joined portion 37 (self-alignment) due to the component force at the weld interface.

As long as the resin continues to melt the spin welding machine continues to rotate and move the liquid container 18 downward to a position where the joining face 29 of the liquid container 18 is just slightly below the reference face 38 of the joined portion 37. Thereby, as shown in FIG. 4B, the bottom end side of the outer annular member 28 of the liquid container 18 is welded to the joined portion 37 of the injection unit 20 in a state in which the interface between the two components has substantially disappeared. The joined portion (joining boundary) between the outer annular member 28 of the liquid container 18 and the joined portion 37 of the unit main body portion 34 is then positioned below the blade portions 66 of the boring member 62.

Usually when carrying out resin-to-resin spin welding as described above, some of the melted resin extends out from the joined portion of the outer annular member 28 and the joined portion 37 to either the outer peripheral side or the inner peripheral side, or to both sides of the joined portion, as burrs 108, 110, as shown in FIG. 4B. The burr 108 that has extended to the outer peripheral side of the joined portion is removed as necessary after the welding operation is completed since it is readily seen and can be removed with certainty. The burr 110 extending out to the inner peripheral side of the joined portion is prevented from moving toward the inner peripheral side by abutting the bottom end of the inner peripheral surface of the tubular inner annular member 104, and the tip end side of the burr 110 is guided upward along the inner peripheral surface of the liquid supply pressure chamber 40.

Operation of the Sealing Pump-Up Device

Explanation will now be given of the operational sequence for repairing the punctured tire 100 using the sealing pump-up device 10 according to the first exemplary embodiment.

When a puncture occurs in the tire 100, the operator first screws the valve adapter 80 of the joint hose 78 onto the tire valve 102 of the tire 100, making the liquid supply pressure chamber 40 communicate with the inside of the tire 100 through the joint hose 78.

The operator then inserts the insertion portion 84 of the press jig 82 into the jig insertion hole 44 of the sealing pump-up device 10, and the base portion 86 of the press jig 82 abuts the foot portion 36 of the injection unit 20, and also the fitting insertion projection portion 98 of the press jig 82 is pressed into the insertion fitting recess portion 46 of the injection unit 20. Thereby the hole piercing portion 50B, of the boring member 62 pressed by the insertion portion 84, ruptures the aluminum seal 30 and is pushed into the container, and the insertion portion 84 progresses into the container.

When this occurs the press jig 82 moves the insertion portion 84 from the end portion at the entrance deeper into the jig insertion hole 44, while the pair of O-rings 96 disposed on the outer peripheral surface of the insertion portion 84 press against the inner peripheral surface of the jig insertion hole 44. Part-way through this movement the O-ring 96 disposed at the top side of the insertion portion 84 passes by on the inner peripheral side of the air supply ports 58. The boring member 62 also moves the axial portion 63 from within the jig insertion hole 44 to the exit side, while the pair of O-rings 72 disposed on the outer peripheral surface of the axial portion 63 press against the inner peripheral surface of the jig insertion hole 44. Part-way through this movement the O-ring 72 disposed at the bottom side of the axial portion 63 passes by on the inner peripheral side of the air supply ports 58.

Then the sealing pump-up device 10 is placed, for example, on a road surface, with the foot portion 36 at the bottom and the liquid container 18 at the top.

When the insertion portion 84 of the press jig 82 is inserted into the jig insertion hole 44 of the injection unit 20, as shown in FIG. 3, the leading end portion of the insertion portion 84 protrudes out from the leading end of the inner peripheral tubular portion 42, directly facing a hole 31 opened in the aluminum seal 30 by the boring member 62. The sealing agent 32 in the liquid container 18 thereby flows out into the liquid supply pressure chamber 40 through the hole 31.

The compressor unit 12 is started in the state shown in FIG. 3, namely with injection unit 20 and the liquid container 18 held with the liquid container 18 positioned above the injection unit 20. Compressed air generated by the compressor unit 12 is supplied through the air supply path 60 and the jig communication path 88 into the liquid container 18.

When compressed air is supplied into the liquid container 18 the compressed air rises above the sealing agent 32 within the liquid container 18 and forms an air space (air layer) above the sealing agent 32 in the liquid container 18. The sealing agent 32 pressured by the air pressure from the air layer is supplied through the hole 31 opened in the aluminum seal 30 to within the liquid supply pressure chamber 40, and injected from within the liquid supply pressure chamber 40 into the pneumatic tire 100 through the joint hose.

After all of the sealing agent 32 within the liquid container 18 has been expelled the pressurized sealing agent 32 within the liquid supply pressure chamber 40 is supplied into the pneumatic tire 100 through the joint hose 78. When all of the sealing agent 32 is ejected from the liquid supply pressure chamber 40 and the joint hose 78, compressed air is injected into the tire 100 through the liquid container 18, the liquid supply pressure chamber 40, and the joint hose 78.

The compressor unit 12 is stopped when the operator has confirmed, using a pressure gauge 79, that the specified internal pressure of the tire 100 has been reached and the valve adapter 80 is removed from the tire valve 102.

Within a specific period of time after finishing inflating the tire 100 the operator carries out preparatory running of the tire by traveling a specific distance using the sealing agent 32 injected tire 100. The sealing agent 32 within the tire 100 thereby spreads out uniformly, the sealing agent 32 fills the puncture hole and seals the puncture hole. The internal pressure of the tire 100 is re-measured after completing preparatory running, and if necessary the valve adapter 80 of the joint hose 78 is screwed again onto the tire valve 102, the compressor unit 12 is re-operated and the tire 100 pressurized to the specified internal pressure. Puncture repair of the tire 100 is thereby completed and it is possible to drive using the tire 100 within a specific distance range while not exceeding a specific speed (for example not exceeding 80 km/h).

In the sealing pump-up device 10 of the present exemplary embodiment, the outer annular member 28 is disposed at the outer peripheral side of the ejection port 24 of the liquid container 18. The ejection port 24 is provided in a position that protrudes below the blade portions 66 of the boring member 62 held in the jig insertion hole 44. The joined portion 37 of the injection unit 20 is joined to the joining face 29 of the outer annular member 28 around the entire circumference using spin welding. Therefore, the outer annular member 28 of the liquid container 18 can be joined to the joined portion 37 of the injection unit 20 with sufficient strength to withstand the static pressure acting on the liquid container 18 and the injection unit 20 when the sealing agent 32 is supplied from the liquid container 18 into the tire 100, and sufficiently high sealing can be achieved between the outer annular member 28 and the joined portion 37.

Since the outer annular member 28 of the liquid container 18 protrudes below the blade portions 66 of the boring member 62 held within the jig insertion hole 44 in this state, the joining face 29 of the outer annular member 28 and the joined portion 37 of the injection unit 20 that is welded to this joining face, are each positioned below the blade portions 66 of the boring member 62. Namely, since the blade portions 66 of the boring member 62 are already in a state of closer proximity to the aluminum seal 30 than the joint portion (joining surfaces) between the joining face 29 and the joined portion 37, the burr 110 can effectively be prevented from insertion between the blade portions 66 of the boring member 62 and the aluminum seal 30, even if the burr 110 generated at the joint portion of the joining face 29 and the joined portion 37 extends out to the inner peripheral side.

As a result, according to the sealing pump-up device 10, the press jig 82 is inserted into the jig insertion hole 44, and when the axial portion 63 of the boring member 62 is pushed out from within the jig insertion hole 44, the burr 108 generated by welding at the joint portion of the liquid container 18 and the injection unit 20 can be prevented from being pushed out to the aluminum seal 30 side, preventing interfering with the blade portions 66 of the boring member 62 and obstruction of the piercing of the aluminum seal by the blade portions 66 of the boring member 62.

In addition, in the sealing pump-up device 10, the tubular inner annular member 104 is integrally formed to the inner peripheral side of the joined portion 37 of the injection unit 20 in a tubular shape so as to surround the boring member 62 held in the jig insertion hole 44 from the outer peripheral side. The burr housing unit 106 is also formed as a substantially circular cylindrical shaped space between the reference face 38 of the liquid container 18 and the tubular inner annular member 104. Consequently, movement of the burr 110 extending out to the inner peripheral side from the joint portion of the outer annular member 28 and the joined portion 37 can be prevented to the boring member 62 side by the tubular inner annular member 104 while the tip end of the burr 110 can be guided upward by the tubular inner annular member 104. This thus, ensures that the burr 110 is held within the burr housing unit 106 and the burr 110 can be prevented from intruding between the blade portions 66 of the boring member 62 and the aluminum seal 30.

The height H of the tubular inner annular member and the internal volume V of the burr housing unit 106 are set according to the maximum dimension and volume of the burr 110 generated from the joint portion of the outer annular member 28 and the joined portion 37. Namely the maximum dimension and volume of the burr 110 are each determined according to: the value set for the weld equivalent, this being the overlap amount in the axial direction between the outer annular member 28 and the joined portion 37 when welding is completed; the dimensional variance of the outer annular member 28 along the axial direction; the dimensional variance from the bottom face of the injection unit 20 up to the joined portion 37; and the variation of the movement relative to the set value when the spin welding machine moves the liquid container 18 down. Since the maximum height H and maximum volume of the burr 110 can be estimated by consideration of these factors, the height H and the internal volume V are each set in the sealing pump-up device 10 of the present exemplary embodiment so as to ensure that the burr 110 is held within the burr housing unit 106 even if the burr 110 of maximum dimension and maximum volume is generated. Specifically, for example, the height H is set at 5 mm and the internal volume V is set at 1000 mm$^3$.

Configuration may be made with the liquid container 18 and the injection unit 20 as shown in FIG. 5, with an outer annular member 120 formed extending out to the liquid container 18 side from the unit main body portion 34 and with an inner annular member 122 formed to the inner peripheral side of the outer annular member 120. A burr housing unit 124 is formed between the outer annular member 120 and the inner annular member 122, the top end face of the outer annular member 120 is welded to an annular joining face 126 formed at the bottom end of the liquid container 18 so that the top end face of the inner annular member 122 is made to substantially contact the liquid container 18. By so doing a welding burr extending out to the inner peripheral side from the joint portion of the outer annular member 120 and the joining face 126 is prevented from moving to the boring member 62 side by the inner annular member 122, and also the tip end of the welding burr is guided upward by the inner annular member 104 so the welding burr is held within the burr housing unit 124 and the welding burr can be prevented from intruding between the blade portions 66 of the boring member 62 and the aluminum seal 30.

Second Exemplary Embodiment

Explanation will be given below of a sealing pump-up device according to a second exemplary embodiment of the present invention. Components which are the same as those of the configuration of the first exemplary embodiment are allocated the same reference numerals, and explanation thereof is omitted.

Figure 6:
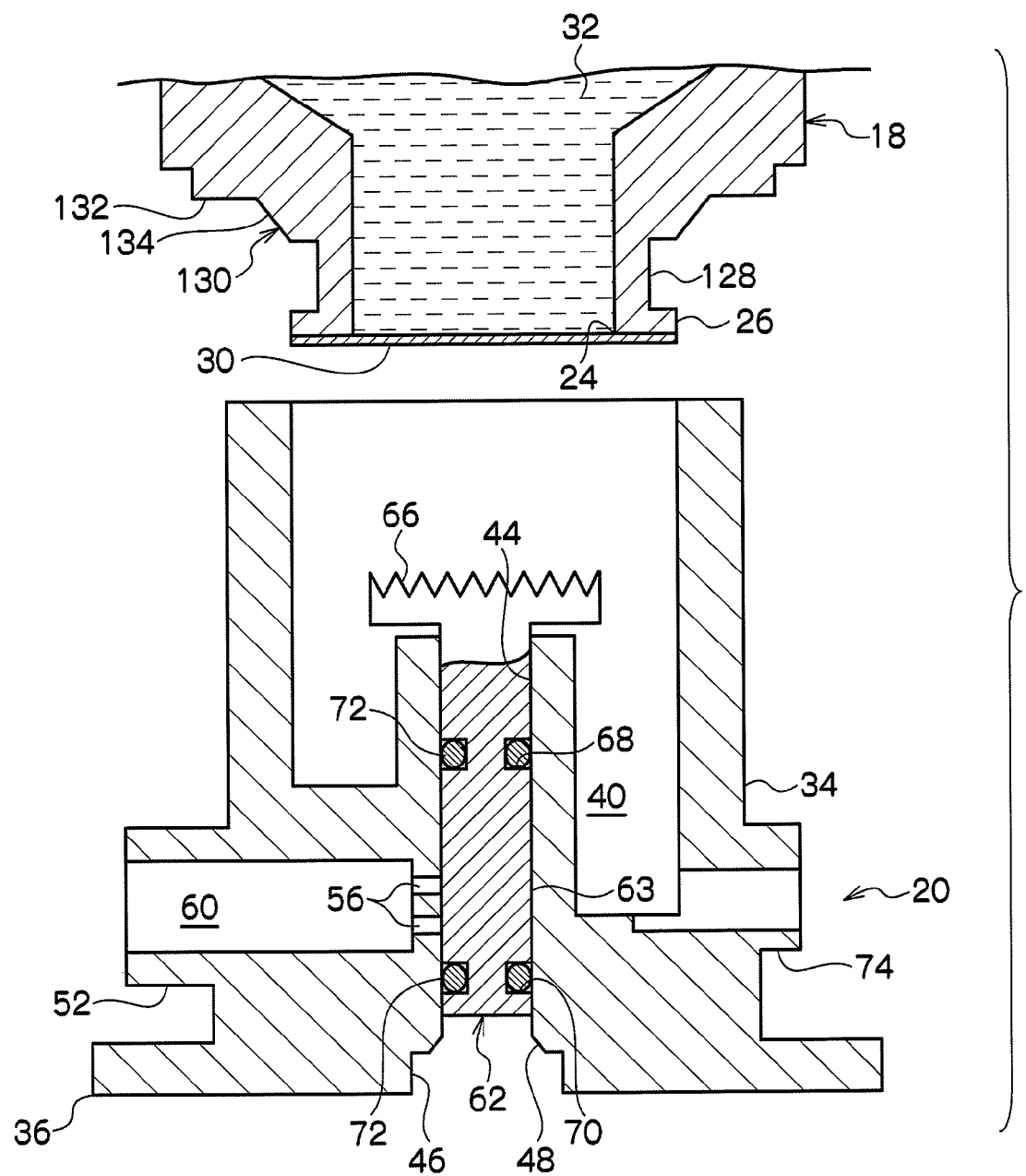
FIG. 6 is a cross-section of a liquid container, an injection unit and a press jig according to a second exemplary embodiment, shown prior to spin welding.

The liquid container 18 of the present exemplary embodiment, prior to assembly to the injection unit 20, is configured with a burr housing unit 128 of an annular groove in the outer peripheral surface of the neck portion 26, as shown in FIG. 6.

A joined portion 130 is formed to a base side portion of the neck portion 26. An annular reference face 132 is formed so as to extend as a flat surface in the radial direction at the outer peripheral side of the joined portion 130, and an annular guide face 134 is formed in a tapered shape at the inner peripheral side of the reference face 132.

The unit main body portion 34 is formed so that the neck portion 26 is insertable therein. In the present exemplary embodiment the neck portion 26 configures the inner annular member, and the unit main body portion 34 configures the outer annular member.

Figure 7:
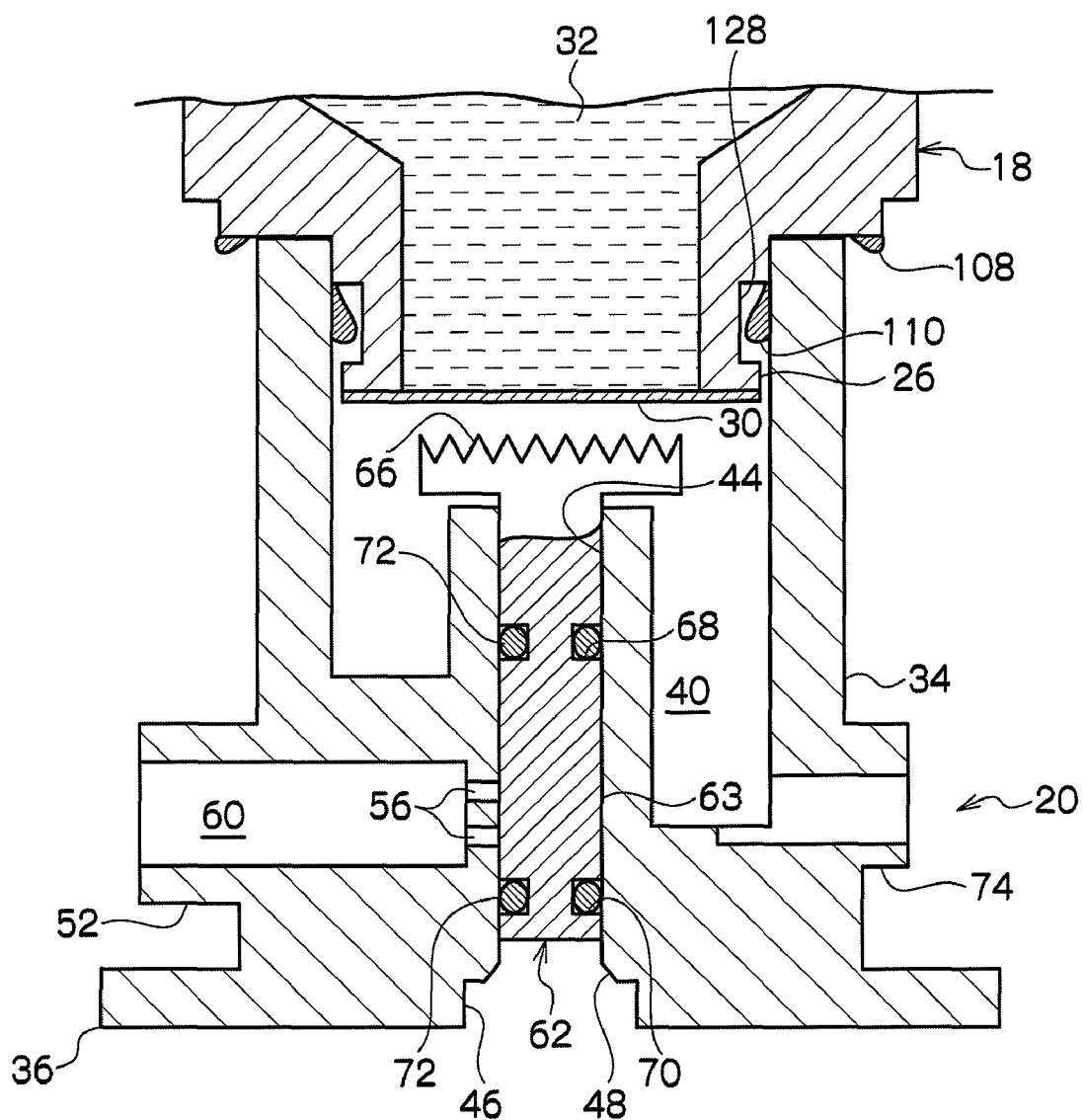
FIG. 7 is a cross-section of a liquid container, an injection unit and a press jig according to the second exemplary embodiment, shown after spin welding.

In the sealing pump-up device 10 of the present exemplary embodiment the leading end portion of the unit main body portion 34 is joined to the joined portion 130 to the liquid container 18 by spin welding, so that the liquid container 18 is connected and fixed to the injection unit 20 as shown in FIG. 7.

In the present exemplary embodiment the burr 110 extends out to the inner peripheral side of the spin welding joint portion and the burr 110 is housed in the groove shaped burr housing unit 128 provided to the outer peripheral surface of the neck portion 26, preventing adhesion to the aluminum seal 30. There is a small gap provided between the neck portion 26 more to the leading end side than the burr housing unit 128 and the inner peripheral surface of the unit main body portion 34.

Explanation of the Reference Numerals 10 sealing pump-up device
18 liquid container
20 injection unit
28 outer annular member
29 joining face
30 aluminum seal
32 sealing agent
37 joined portion
40 liquid supply pressure chamber
44 jig insertion hole
48 insertion guide face
50 pressure hose
52 air supply tube
60 air supply path
62 boring member
66 blade portions
74 air-liquid supply tube
78 joint hose
82 press jig 88 jig communication path
100 tire
104 tubular inner annular member
106 burr housing unit
108, 110 burr
120 outer annular member
122 inner annular member
124 burr housing unit
128 burr housing unit

The invention claimed is:

1. A sealing pump-up device comprising:
a liquid container for storing a sealing agent, the liquid container also formed with an ejection port for ejecting the sealing agent;
an injection unit comprising
   an air supply path, configuring a liquid supply pressure chamber in communication with the ejection port and also connected to an air supply source for supplying compressed air, and
   an air-liquid supply tube connectable to a valve of a pneumatic tire;
an outer annular member provided to one or other of the liquid container or the injection unit and of a greater diameter than that of the ejection port;
   an inner annular member, provided to the other of the liquid container and the injection unit, of smaller diameter that that of the outer annular member and disposed to the radial direction inside of the outer annular member; and
   a burr housing unit configured between the outer annular member and the inner annular member, the liquid container being fixed to the injection unit via the outer annular member,
wherein:
the outer annular member extends from the liquid container and is welded to the injection unit;
the inner annular member extends from the injection unit; and
the burr housing unit configured between the outer annular member and the inner annular member is positioned between the welding face of the outer annular member and the injection unit, and the liquid ejection port of the liquid container.

2. A sealing pump-up device comprising:
a liquid container for storing a sealing agent, the liquid container also formed with an election port for ejecting the sealing agent;
an injection unit comprising
   an air supply path, configuring a liquid supply pressure chamber in communication with the ejection port and also connected to an air supply source for supplying compressed air, and
   an air-liquid supply tube connectable to a valve of a pneumatic tire;
an outer annular member provided to one or other of the liquid container or the injection unit and of a greater diameter than that of the ejection port;
   an inner annular member, provided to the other of the liquid container and the injection unit, of smaller diameter that that of the outer annular member and disposed to the radial direction inside of the outer annular member; and
   a burr housing unit configured between the outer annular member and the inner annular member, the liquid container being fixed to the injection unit via the outer annular member,
wherein:
the outer annular member extends from the injection unit and the outer annular member and the liquid container are welded together;
the inner annular member extends from the injection unit so as to substantially contact the liquid container; and
the burr housing unit is formed by the inner annular member.

3. A sealing pump-up device comprising:
a liquid container for storing a sealing agent, the liquid container also formed with an ejection port for ejecting the sealing agent;
an injection unit comprising
   an air supply path, configuring a liquid supply pressure chamber in communication with the ejection port and also connected to an air supply source for supplying compressed air, and
   an air-liquid supply tube connectable to a valve of a pneumatic tire;
an outer annular member provided to one or other of the liquid container or the injection unit and of a greater diameter than that of the ejection port;
   an inner annular member, provided to the other of the liquid container and the injection unit, of smaller diameter that that of the outer annular member and disposed to the radial direction inside of the outer annular member; and
   a burr housing unit configured between the outer annular member and the inner annular member, the liquid container being fixed to the injection unit via the outer annular member,
wherein:
the inner annular member extends from a main body portion of the liquid container and is inserted inside the outer annular member;
the outer annular member extends from the injection unit and an end portion of the outer annular member is welded to the main body portion of the liquid container; and
the burr housing unit is a groove formed in the outer peripheral surface of the inner annular member.

* * * * *